United States Patent
Li et al.

(10) Patent No.: US 9,448,391 B2
(45) Date of Patent: Sep. 20, 2016

(54) VARIOFOCUSING MONITORING SHOT AND MONITORING DEVICE

(71) Applicants: HAN'S LASER TECHNOLOGY INDUSTRY GROUP CO., LTD., Shenzhen (CN); HAN'S CNC SCIENCE AND TECHNOLOGY CO., LTD, Shenzhen (CN)

(72) Inventors: Jiaying Li, Shenzhen (CN); Yunfeng Gao, Shenzhen (CN)

(73) Assignees: HAN'S LASER TECHNOLOGY INDUSTRY GROUP CO., LTD., Shenzhen (CN); HAN'S CNC SCIENCE AND TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 14/439,730

(22) PCT Filed: Oct. 31, 2012

(86) PCT No.: PCT/CN2012/083832
§ 371 (c)(1),
(2) Date: Apr. 30, 2015

(87) PCT Pub. No.: WO2014/067091
PCT Pub. Date: May 8, 2014

(65) Prior Publication Data
US 2015/0293334 A1 Oct. 15, 2015

(51) Int. Cl.
*G02B 15/14* (2006.01)
*G02B 15/173* (2006.01)
(Continued)

(52) U.S. Cl.
CPC ............... *G02B 15/14* (2013.01); *G02B 7/10* (2013.01); *G02B 15/173* (2013.01); *H04N 5/23296* (2013.01); *H04N 5/372* (2013.01)

(58) Field of Classification Search
CPC .... G02B 15/14; G02B 15/173; G02B 15/15; G02B 15/16; G02B 15/163; G02B 15/22; G02B 7/10; H04N 5/372; H04N 5/23296
See application file for complete search history.

(56) References Cited

U.S. PATENT DOCUMENTS

| 7,450,315 B2 | 11/2008 | Tomioka |
| 8,675,286 B2 * | 3/2014 | Uchida ................ G02B 15/163 359/676 |

(Continued)

FOREIGN PATENT DOCUMENTS

| CN | 101101366 A | 1/2008 |
| CN | 102081222 A | 6/2011 |

(Continued)

OTHER PUBLICATIONS

International Search Report dated Aug. 1, 2013.
(Continued)

*Primary Examiner* — Jordan Schwartz
(74) *Attorney, Agent, or Firm* — Polsinelli PC (57) ABSTRACT

A zoom lens assembly for monitor and a monitoring device are provided. The lens assembly comprises a first to a thirteenth lenses (L1-L13) arranged successively coaxially along the transmission direction of an incident light beam. The first, the eighth, the tenth and the twelfth lenses (L1, L8, L10 and L12) are biconvex positive lenses; the second, the ninth and the eleventh lenses (L2, L9 and L11) are falcate negative lenses; the third, the fourth, the sixth and the thirteenth lenses (L3, L4, L6 and L13) are falcate positive lenses; the fifth lens (L5) is a biconcave negative lens; and the seventh lens (L7) is a plano-concave negative lens. The second and the third lenses (L2 and L3) are closely adhered to each other, and the sixth and the seventh lenses (L6 and L7) are closely adhered to each other. The intermediate parts of the second, the third, the fourth and the thirteenth lenses (L2, L3, L4 and L13) are all convex toward a direction reverse to the transmission direction an incident light beam; the intermediate parts of the sixth, the ninth and the eleventh lenses (L6, L9 and L11) are all convex toward the transmission direction of the incident light beam; and the fifth, the sixth and the seventh lenses (L5, L6 and L7) can move synchronously along a light axis direction. The shot can realize all-weather, wide-range and variofocusing monitoring. The shot has a high imaging sharpness and a simple structure; and the cost of the material is low, thus controlling the manufacturing cost effectively.

13 Claims, 8 Drawing Sheets

(51) Int. Cl.
*G02B 7/10* (2006.01)
*H04N 5/232* (2006.01)
*H04N 5/372* (2011.01)

(56) References Cited

U.S. PATENT DOCUMENTS

| | | | |
|---|---|---|---|
| 9,158,092 B2* | 10/2015 | Izuhara | G02B 15/20 |
| 9,341,830 B2* | 5/2016 | Hara | G02B 15/173 |
| 2007/0279762 A1 | 12/2007 | Tomioka | |
| 2011/0188130 A1 | 8/2011 | Sato | |
| 2012/0026604 A1 | 2/2012 | Aoi | |

FOREIGN PATENT DOCUMENTS

| | | |
|---|---|---|
| JP | H08-278446 A | 10/1996 |
| JP | 2005-208560 A | 8/2005 |
| JP | 2010113179 A | 5/2010 |

OTHER PUBLICATIONS

Gross, Herbert et al. Handbook of Optical Systems, vol. 3: Aberration Theory and Correction of Optical Systems; Jan. 1, 2007, pp. 377-379.

Supplemental European Search Report dated Jul. 6, 2016 from European Application No. 12887692.7, pp. 1-9.

* cited by examiner

VARIOFOCUSING MONITORING SHOT AND MONITORING DEVICE

CROSS-REFERENCE TO RELATED APPLICATIONS

This application is a National Phase filing under 35 U.S.C. §371 of PCT/CN2012/083832 filed on Oct. 31, 2012, the entire contents of which is hereby incorporated by reference.

FIELD OF THE INVENTION

The present invention relates to the field of optical technology, and more particularly relates to a zoom lens assembly for surveillance and a surveillance device.

BACKGROUND OF THE INVENTION

With the extensive application of surveillance television, there is an increasing demand on time and range of surveillance, such as the ability of surveillance day and night with protection from the weather and the need for larger scale surveillance to reduce the limitation of surveillance space. However, the currently used surveillance televisions cannot satisfy the requirements, and there is an urgent need to upgrade them. The function upgrading of surveillance device mainly depends on the improvement of the lens assembly for surveillance.

SUMMARY OF THE INVENTION

Technology Problem

It is an object of the present invention to provide a zoom lens assembly for surveillance, thus allowing an all-weather, large-scale, and zoom surveillance.

Technology Solution

The present invention is achieved in this way, a zoom lens assembly for surveillance includes a first lens, a second lens, a third lens, a fourth lens, a fifth lens, a sixth lens, a seventh lens, an eighth lens, a ninth lens, a tenth lens, an eleventh lens, a twelfth lens, and a thirteenth lens, which are arranged successively coaxially along a transmission direction of an incident light beam.

The first, the eighth, the tenth, and the twelfth lenses are positive biconvex lenses, the second, the ninth, and the eleventh lenses are negative meniscus lenses, the third, the fourth, the sixth, and the thirteenth lenses are positive meniscus lenses, the fifth lens is a negative biconcave lens, the seventh lens is a negative plano-concave lens;

The second lens and the third lens are closely attached to each other, the sixth lens and the seventh lens are closely attached to each other.

Intermediate parts of the second, the third, the fourth, and the thirteenth lenses are convex toward a direction reverse to the transmission direction of the incident light beam.

Intermediate parts of the sixth, the ninth, and the eleventh lenses are convex toward the transmission direction of the incident light beam.

The fifth, the sixth, and the seventh lenses are capable of moving synchronously along a direction of optical axis.

Another object of the present invention is to provide a surveillance device, which includes a lens assembly for surveillance and an imaging apparatus positioned on the image side of the lens assembly for surveillance, the lens assembly for surveillance is the above zoom lens assembly for surveillance.

Advantages

The present invention is able to perform a clear broad spectrum imaging by designing the shape and relative positions of various lens as described above. In addition to imaging through common visible light, it can perform clear imaging through infrared light. Thus the surveillance device using this lens assembly not only can get color images during surveillance of day time, but also can perform surveillance tasks at night with complete darkness environment to achieve all-weather surveillance. Furthermore, the lens assembly has an adjustable focal length and a large field of view variable range. The effective distance for surveillance can reach 0 to 500 m, which can achieve large range and zoom surveillance. Moreover, the lens assembly has a high imaging resolution, and each lens can be made of optical glass with relatively low cost to reduce manufacturing costs significantly.

BRIEF DESCRIPTION OF THE DRAWINGS

FIG. 1-1 is a schematic diagram of a zoom lens assembly with a short focal length according to an embodiment of the present invention;

FIG. 1-2 is a graph illustrating a geometrical aberration of the zoom lens assembly with a short focal length according to an embodiment of the present invention;

FIG. 1-3 is a graph illustrating a distortion of the zoom lens assembly with a short focal length according to an embodiment of the present invention;

FIG. 1-4 is a graph illustrating an optical transfer function (O.T.F) of the zoom lens assembly with a short focal length according to an embodiment of the present invention;

FIG. 1-5 is a graph illustrating a modulation transfer function (M.T.F) of the zoom lens assembly with a short focal length according to an embodiment of the present invention;

FIG. 2-1 is a schematic diagram of a zoom lens assembly with a mid-focal length according to an embodiment of the present invention;

FIG. 2-2 is a graph illustrating a geometrical aberration of the zoom lens assembly with a mid-focal length according to an embodiment of the present invention;

FIG. 2-3 is a graph illustrating a distortion of the zoom lens assembly with a mid-focal length according to an embodiment of the present invention;

FIG. 2-4 is a graph illustrating an optical transfer function (O.T.F) of the zoom lens assembly with a mid-focal length according to an embodiment of the present invention;

FIG. 2-5 is a graph illustrating a modulation transfer function (M.T.F) of the zoom lens assembly with a mid-focal length according to an embodiment of the present invention;

FIG. 3-1 is a schematic diagram of a zoom lens assembly with a long focal length according to an embodiment of the present invention;

FIG. 3-2 is a graph illustrating a geometrical aberration of the zoom lens assembly with a long focal length according to an embodiment of the present invention;

FIG. 3-3 is a graph illustrating a distortion of the zoom lens assembly with a long focal length according to an embodiment of the present invention;

FIG. 3-4 is a graph illustrating an optical transfer function (O.T.F) of the zoom lens assembly with a long focal length according to an embodiment of the present invention;

FIG. 3-5 is a graph illustrating a modulation transfer function (M.T.F) of the zoom lens assembly with a long focal length according to an embodiment of the present invention;

DETAILED DESCRIPTION OF THE EMBODIMENTS

The above objects, features and advantages of the present invention will become more apparent by describing in detail embodiments thereof with reference to the accompanying drawings. It will be understood that the particular device embodying the invention are shown by way of illustration and not as a limitation of the invention.

Embodiments of the invention are described more fully hereinafter with reference to the accompanying drawings.

Figure 1:
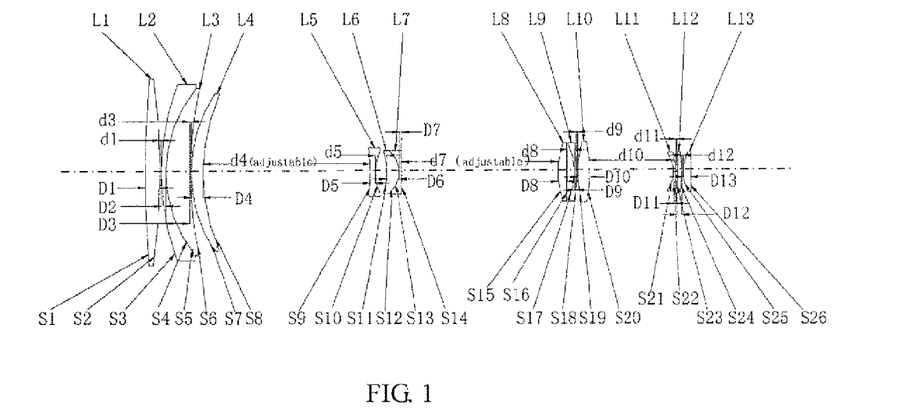
FIG. 1 is a schematic diagram of a zoom lens assembly for surveillance according to the present invention.

FIG. 1 illustrates a schematic diagram of a zoom lens assembly for surveillance according to an embodiment of present invention, only the parts related to the present embodiment are shown for convenience of description.

The zoom lens assembly for surveillance includes at least thirteen lenses, i.e. the first lens L1, the second lens L2, the third lens L3, the fourth lens L4, the fifth lens L5, the sixth lens L6, the seventh lens L7, the eighth lens L8, the ninth lens L9, the tenth lens L10, the eleventh lens L11, the twelfth lens L12, and the thirteenth lens L13, these thirteen lenses are arranged successively coaxially along a transmission direction of an incident light beam. Among them, the first to the fourth lenses constitute a compensation lens group, the fifth, the sixth, and the seventh lenses constitute a zoom lens group, the fifth, the sixth, and the seventh lenses are capable of moving synchronously along a direction of an optical axis for changing focal length, its zoom magnification is linearly proportional to its floating distance, while the compensation lens group conduct a fine adjustment for the focal length after large-scale focusing initially conducted by the zoom lens group. FIGS. 1-1, 2-1, and 3-1 are schematic diagrams of zoom lens assemblies with short focal length, mid-focal length, and long focal length respectively. By changing positions of the zoom lens group along the direction of the optical axis and conducting a fine adjustment for focal length using the compensation lens group, the focal length can be precisely adjusted, thus obtaining lenses with short focal length, mid-focal length, and long focal length. The eighth to the thirteenth lenses constitute the fixed lens group, a working distance thereof is 17.5 mm when ƒ=10 to 240 mm, which is equivalent to an objective lens with long working distance. In addition, the first lens L1, the eighth lens L8, the tenth lens L10, and the twelfth lens L12, are positive biconvex lenses, the second lens L2, the ninth lens L9, and the eleventh lens L11 are negative meniscus lenses, the third lens L3, the fourth lens L4, the sixth lens L6, and the thirteenth lens L13 are positive meniscus lenses, the fifth lens L5 is a negative biconcave lens, the seventh lens L7 is a negative plano-concave lens. In addition, the second lens L2 and the third lens L3 are closely attached to each other, the sixth lens L6 and the seventh lens L7 are closely attached to each other, they can be bonded together by adhesive with high transmittance. Moreover, intermediate parts of the second lens L2, the third lens L3, the fourth lens L4, and the thirteenth lens L13 are convex toward a direction reverse to the transmission direction of the incident light beam, i.e. convex toward an object space. Intermediate parts of the sixth lens L6, the ninth lens L9, and the eleventh lens L11 are convex toward the transmission direction of the incident light beam, i.e. convex toward an image space.

Further still, this embodiment conducts optimized design of parameters for surface curvature of each lenses, thickness of lenses, etc. Specifically, the first lens L1 includes a first surface S1 and a second surface S2, curvature radiuses thereof are 600 mm and −400 mm respectively; the second lens L2 includes a third surface S3 and a fourth surface S4, curvature radiuses are 100 mm and 60 mm respectively; the third lens L3 includes a fifth surface S5 and the sixth surface S6, curvature radiuses are 60 mm and 180 mm respectively; the fourth lens L4 includes a seventh surface S7 and an eighth surface S8, curvature radiuses are 70 mm and 100 mm respectively; the fifth lens L5 includes a ninth surface S9 and a tenth surface S10, curvature radiuses are −100 mm and 20 mm respectively; the sixth lens L6 includes a eleventh surface S11 and a twelfth surface S12, curvature radiuses are −30 mm and −12 mm respectively; the seventh lens L7 includes a thirteenth surface S13 and a fourteenth surface S14, curvature radiuses are −12 mm and ∞ respectively; the eighth lens L8 includes a fifteenth surface S15 and a sixteenth surface S16, curvature radiuses are 40 mm and −200 mm respectively; the ninth lens L9 includes a seventeenth surface S17 and an eighteenth surface S18, curvature radiuses are −32 mm and −100 mm respectively; the tenth lens L10 includes a nineteenth surface S19 and a twentieth surface S20, curvature radiuses are 50 mm and −70 mm respectively; the eleventh lens L11 includes a twenty first surface S21 and a twenty second surface S22, curvature radiuses are 15 mm and −28 mm respectively; the twelfth lens L12 includes a twenty third surface S23 and a twenty fourth surface S24, curvature radiuses are 150 mm and −65 mm respectively; the thirteenth lens L13 includes a twenty fifth surface S25 and a twenty sixth surface S26, curvature radiuses are 20 mm and 144 mm respectively. The negative signs in the parameters above represent that the center of the surfaces is located at the object space, numbers without positive or negative signs can be regarded as positive signs, which represent that the center of the surfaces is located at the image space. The first to the twenty sixth surfaces described above are arranged successively along the transmission direction of the incident light beam, and the curvature radiuses of each surface above are not exclusive, and the tolerances thereof are 5%.

Further still, this embodiment also conducts design for center thicknesses of the first to the thirteenth lenses and distances between each surfaces, specifically, the center thicknesses of the first to the thirteenth lenses D1, D2, D3, D4, . . . D13 are 6 mm, 2 mm, 12 mm, 5 mm, 2 mm, 5 mm, 1 mm, 4 mm, 1 mm, 5 mm, 1 mm, 2 mm, and 4 mm respectively, and the tolerances thereof are 5%. Furthermore, a distance d1 between the second surface S2 and the third surface S3 on the optical axis is 0.5 mm; a distance d3 between the sixth surface S6 and the seventh surface S7 on the optical axis is 0.5 mm; a distance d5 between the tenth surface S10 and the eleventh surface S11 on the optical axis is 5 mm; a distance d8 between the sixteenth surface S16 and the seventeenth surface S17 on the optical axis is 3 mm; a distance d9 between the eighteenth surface S18 and the nineteenth surface S19 on the optical axis is 0.5 min; a distance d10 between the twentieth surface S20 and the twenty first surface S21 on the optical axis is 30 mm; a distance d11 between the twenty second surface S22 and the twenty third surface S23 on the optical axis is 0.5 mm; a distance d12 between the twenty fourth surface S24 and the twenty fifth surface S25 on the optical axis is 0.5 mm; the tolerances thereof are 5%. Since the second lens L2 and the third lens L3 are closely attached to each other, the sixth lens L6 and the seventh lens L7 are closely attached to each other, a distance d2 between the fourth surface S4 and the fifth surface S5 on the optical axis is zero, a distance d6 between the twelfth surface S12 and the thirteenth surface S13 on the optical axis is zero. Besides, the fifth lens, the sixth lens, and the seventh lens are synchronously movable along a direction of optical axis, such that a distance d4 between the eighth fourth surface S8 and the ninth fifth surface S9 on the optical axis and an distance d7 between the fourteenth surface S14 and the fifteenth surface S15 on the optical axis are adjustable, and the focal length of the zoom lens assembly for surveillance can be adjusted within a certain range.

Based on the structural design for each lenses, lens material (ratio of refractive index to Abbe number) can be divided into several types, specifically, ratios of refractive index to Abbe number of the first, the third, the fourth, the fifth, the tenth, the twelfth, and the thirteenth lenses are 1.7/54; ratios of refractive index to Abbe number of the second, the ninth, and the eleventh lenses are 1.8/25; ratio of refractive index to Abbe number of the sixth lens is 1.7/30; ratios of refractive index to Abbe number of the seventh and the eighth lenses are 1.6/60; and the tolerances thereof are 5%. Combining the material above and the structural design above, large-scale and all-weather, and high definition surveillance can be achieved.

A zoom lens assembly for surveillance with specific structure is provided below, with reference to Table 1.

TABLE 1

Structural parameters of a zoom lens assembly for surveillance

| Lens | S(surface) | R(curvature radius) | d(distance between surfaces) | D(center thickness) | Nd/Vd(material) |
|---|---|---|---|---|---|
| 1 | 1 | 600 | | 6 | 1.7/54 |
| | 2 | −400 | 0.5 | | |
| 2 | 3 | 100 | | 2 | 1.8/25 |
| | 4 | 60 | attached | | |
| 3 | 5 | 60 | | 12 | 1.7/54 |
| | 6 | 180 | 0.5 | | |
| 4 | 7 | 70 | | 5 | 1.7/54 |
| | 8 | 100 | adjustable | | |
| 5 | 9 | −100 | | 2 | 1.7/54 |
| | 10 | 20 | 5 | | |
| 6 | 11 | −30 | | 5 | 1.7/30 |
| | 12 | −12 | attached | | |
| 7 | 13 | −12 | | 1 | 1.6/60 |
| | 14 | ∞ | adjustable | | |
| 8 | 15 | 40 | | 4 | 1.6/60 |
| | 16 | −200 | 3 | | |
| 9 | 17 | −32 | | 1 | 1.8/25 |
| | 18 | −100 | 0.5 | | |
| 10 | 19 | 50 | | 5 | 1.7/54 |
| | 20 | −70 | 30 | | |
| 11 | 21 | 15 | | 1 | 1.8/25 |
| | 22 | −28 | 0.5 | | |
| 12 | 23 | 150 | | 2 | 1.7/54 |
| | 24 | −65 | 0.5 | | |
| 13 | 25 | 20 | | 4 | 1.7/54 |
| | 26 | 144 | | | |

The zoom lens assembly for surveillance includes thirteen lenses in total, which can be divided into the compensation lens group (the first to the fourth lenses), the zoom lens group (the fifth to the seventh lenses), and the fixed lens group (the eighth to the thirteenth lenses); while there are only four types of lens material, which not only can achieve all-weather, large-scale, and zoom surveillance using a simple structure, but also can simplify the variety of optical materials and reduce the costs significantly. The lens has optical features as follow:

Optical wavelength $\lambda$=450-820 nm;
The focal length $f$=10-240 mm;
Magnification $\Gamma$=24x;
Relative aperture (ratio of limiting aperture to the focal length) $D'/f$=1:1.8-1:2.8;
Maximum limiting aperture D'max=82 mm;
Field of view angle $2\omega$=35°-1.7°;
Distance of surveillance L'=0-500 m;
The total length of system $L_{tot}$=186-240 mm.

The lens assembly can perform a clear broad spectrum ($\lambda$=450-820 nm) imaging, in addition to imaging through common visible light ($\lambda$=550 nm green light, $\lambda$=486 nm blue light, $\lambda$=656 nm red light), it can perform clear imaging through infrared light, thus this lens assembly not only can obtain color images during surveillance of day time, but also can perform surveillance tasks at night with complete darkness environment to achieve all-weather surveillance. Moreover, the focal length $f$ of the lens assembly can be adjusted between 10 mm and 240 mm, the field of view angle $2\omega$ has relatively large variable range, the effective distance of surveillance can reach 0 to 500 mm, which can achieve large-scale and zoom surveillance. Moreover, the lens assembly has a high imaging resolution, the imaging can reach 300 to 500 million pixels using CCD camera which has a sensitive area of ½″. Furthermore, the whole lens assembly system includes thirteen lenses which can be made of optical glass with relatively low cost to reduce manufacturing costs significantly.

The imaging quality of the lens assemblies for surveillance with short focal length, mid-focal length, and long focal length will be illustrated in conjunction with the following drawings.

Figure 11:
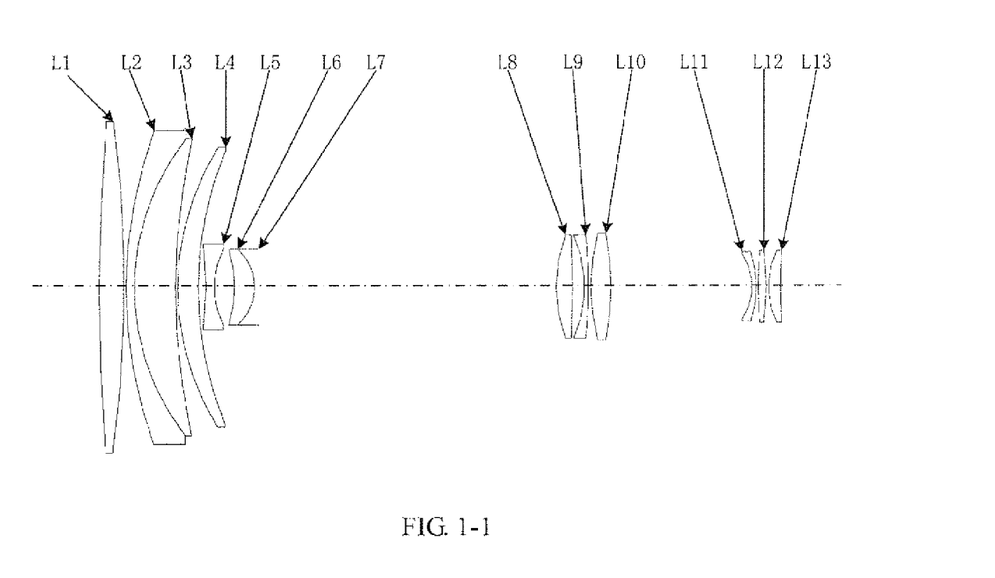
Figure 12:
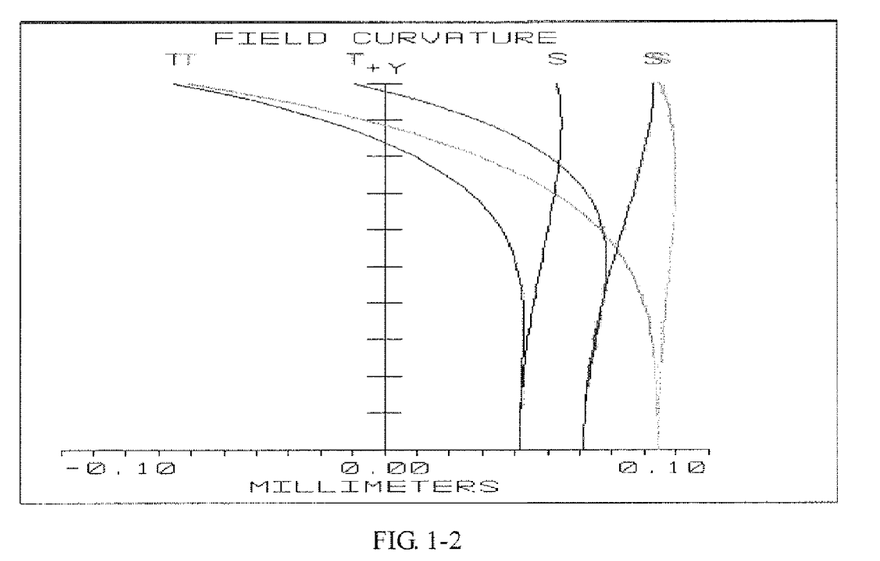
Figure 13:
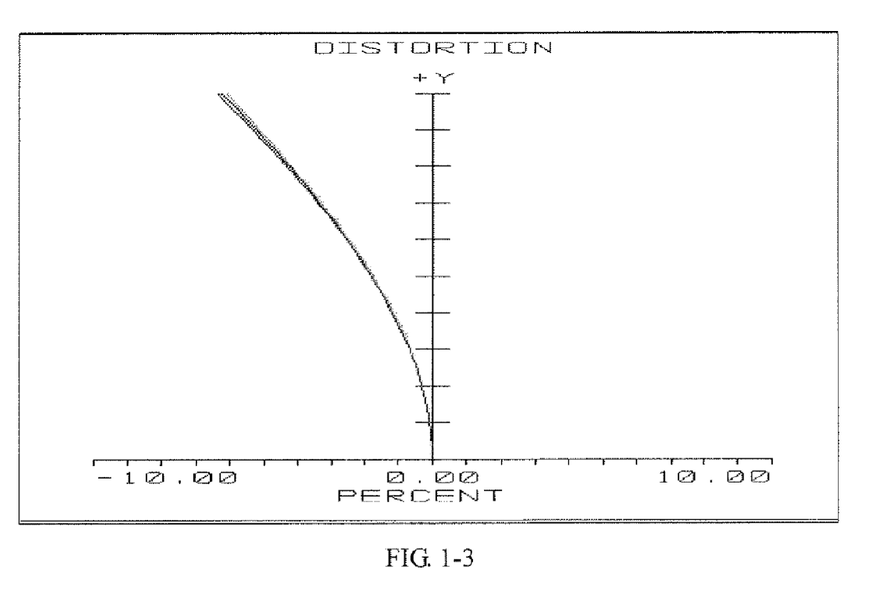

FIG. 1-2 and FIG. 1-3 illustrate a geometrical aberration and a distortion of the zoom lens assembly with short focal length in FIG. 1-1, the geometrical aberration and the distortion of the lens have reached ideal calibration status, where the shortest distortion is only 5%, while the distortion of the lens assembly with the existing field of view which is smaller than similar lens domestic and abroad has reached 6%.

Figure 14:
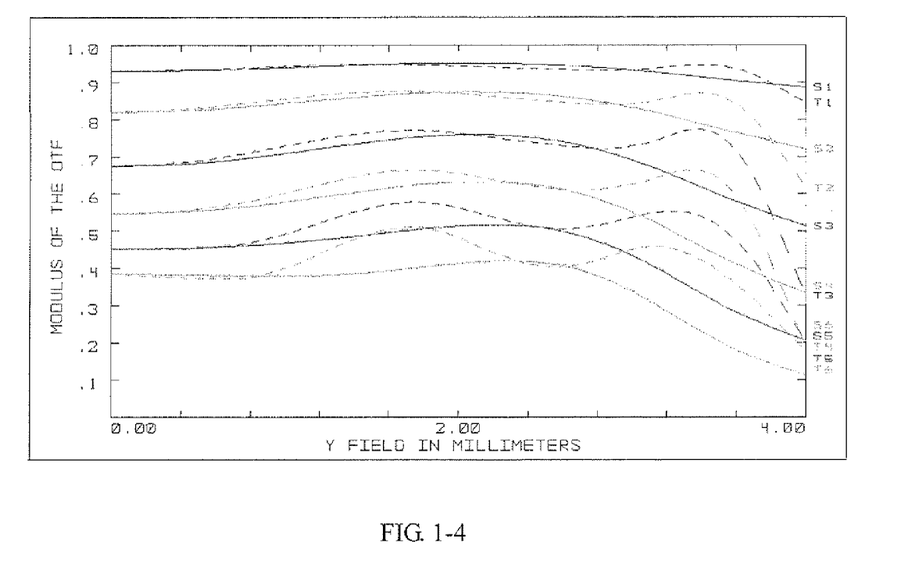

FIG. 1-4 illustrates optical transfer function (O.T.F) of the zoom lens assembly with short focal length, from top to bottom, the graphs represent the O.T.F with resolutions of 10 lp/mm (10 line pairs), 20 lp/mm (20 line pairs), 30 lp/mm (30 line pairs), and 40 lp/mm (40 line pairs). The longitudinal axis represents percentage, the horizontal axis represent the field of view, the unit is mm. FIG. 1-4 illustrates that when the whole field of view is 4 mm, the worst O.T.F of 40 line pairs is 20% while the standard of general lens assembly for surveillance is that the O.T.F of 20 line pairs is 20%, which indicates that the O.T.F of this lens assembly is far superior to conventional lens assembly.

Figure 15:
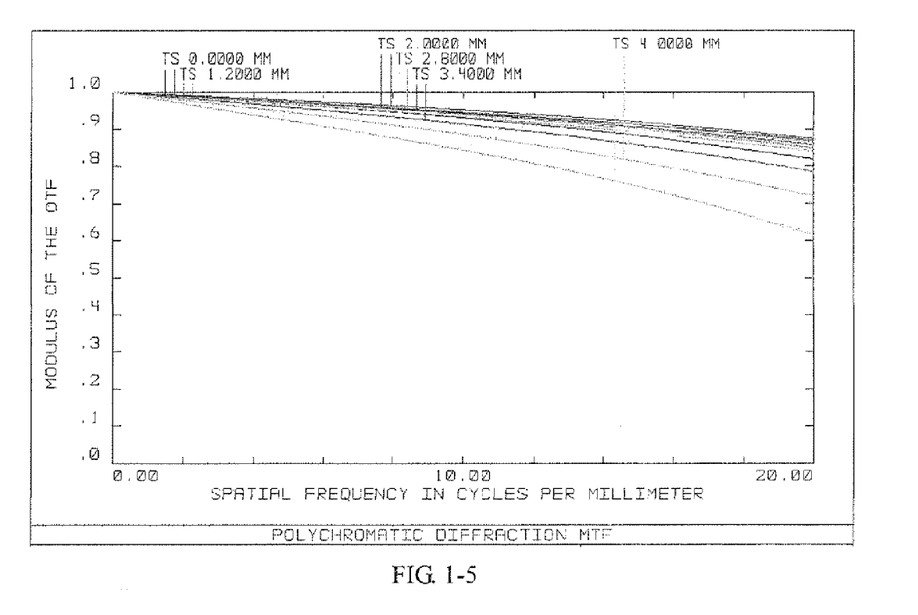
Figure 21:
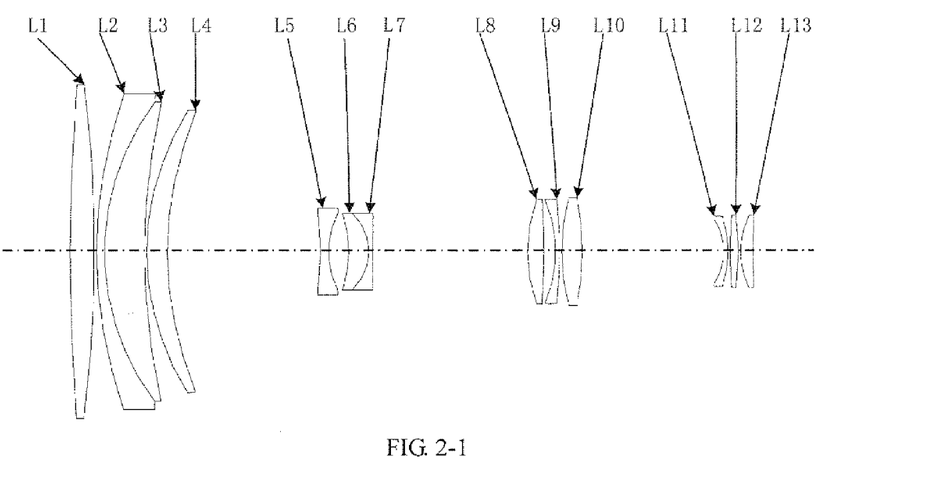
Figure 22:
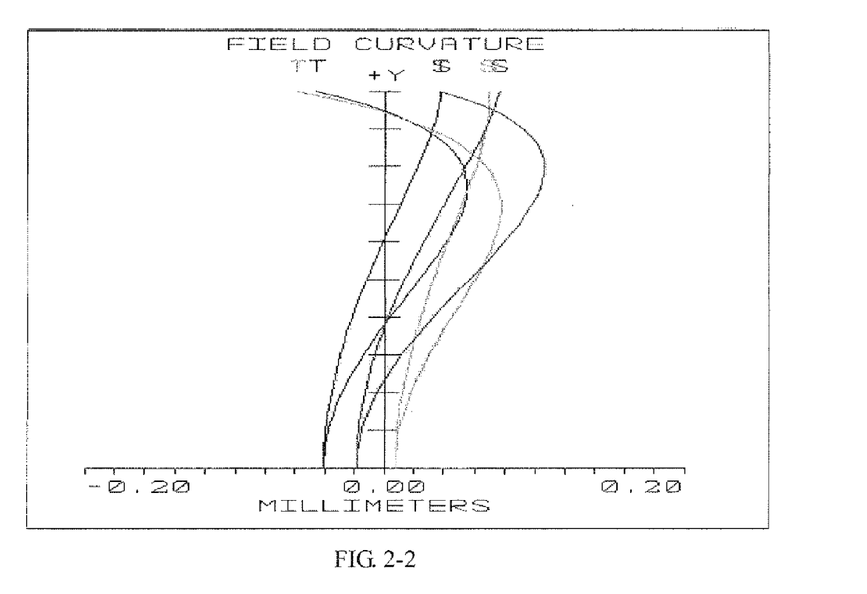

FIG. 1-5 illustrates the modulation transfer function (M.T.F) of the zoom lens assembly with short focal length has reached 0.7 when the resolution is 20 lp/mm, which exceeds far beyond the requirement of photography with M.T.F=0.2.

Similarly, FIGS. 2-2, 2-3, 2-4, and 2-5 illustrate geometrical aberration, distortion, optical transfer function (O.T.F), and modulation transfer function (M.T.F) of the zoom lens assembly with mid-focal length in FIG. 2-1, FIGS. 3-2, 3-3, 3-4, and 3-5 illustrate geometrical aberration, distortion, optical transfer function (O.T.F), and modulation transfer function (M.T.F) of the zoom lens assembly with long focal length in FIG. 3-1. The data in these figures shows that both aberration and distortion of the zoom lens assemblies with mid-focal length and long focal length have reached better calibration statuses, the imaging qualities have reached a ideal level which are completely flat fields, the aberrations within the range of Φ4 mm (diagonal size of CCD) are all smaller than or equal to 0.1 times of the incident wavelength, both O.T.F and M.T.F are superior to the required standards of similar lenses, where high resolution, large-scale, and all-weather surveillance can be certainly achieved.

Figure 23:
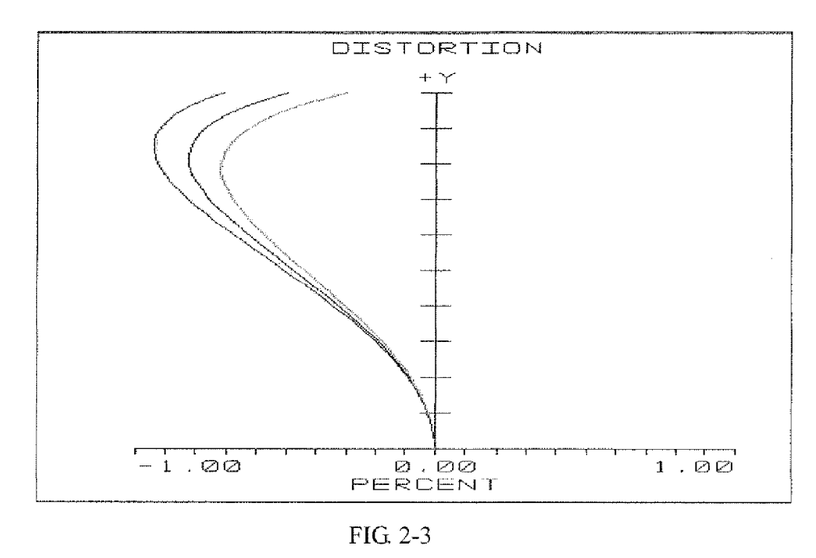
Figure 24:
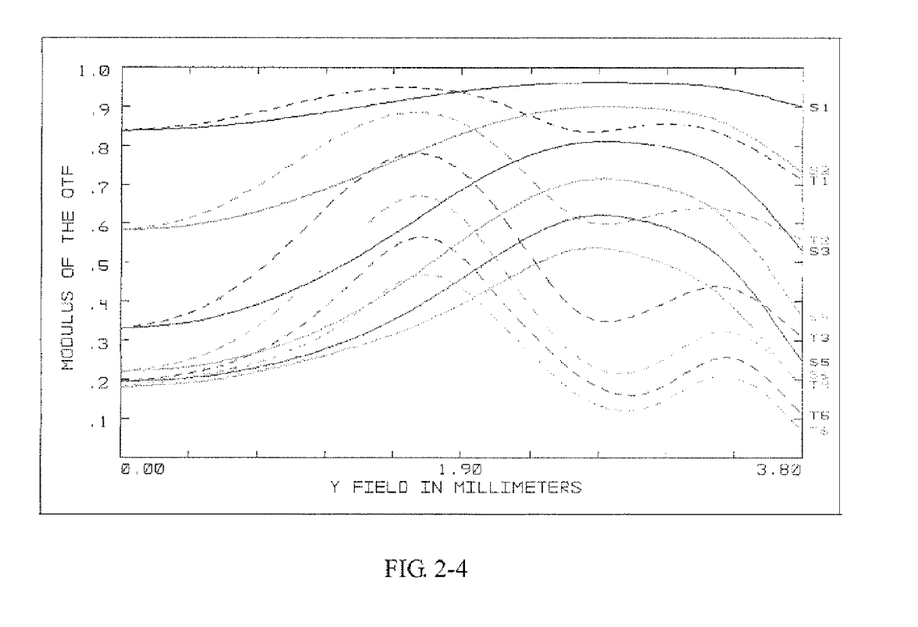
Figure 25:
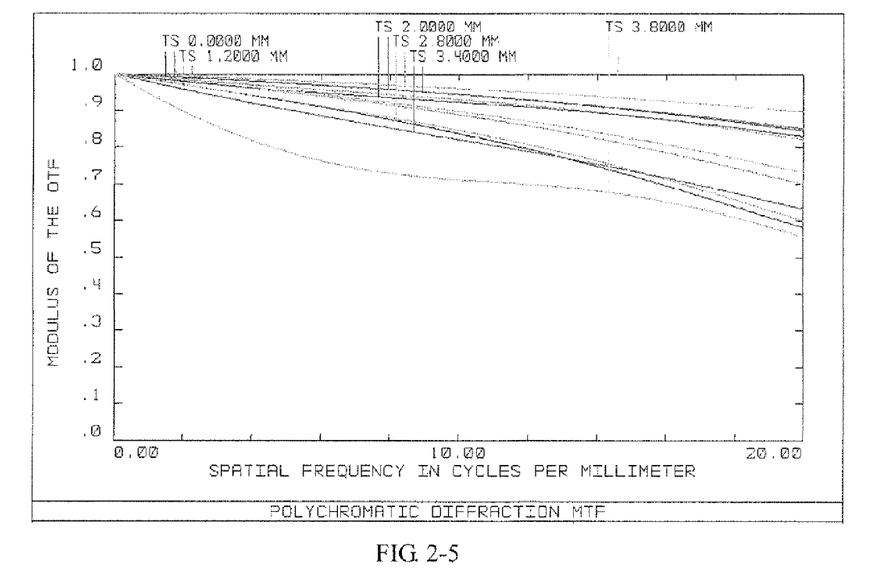
Figure 31:
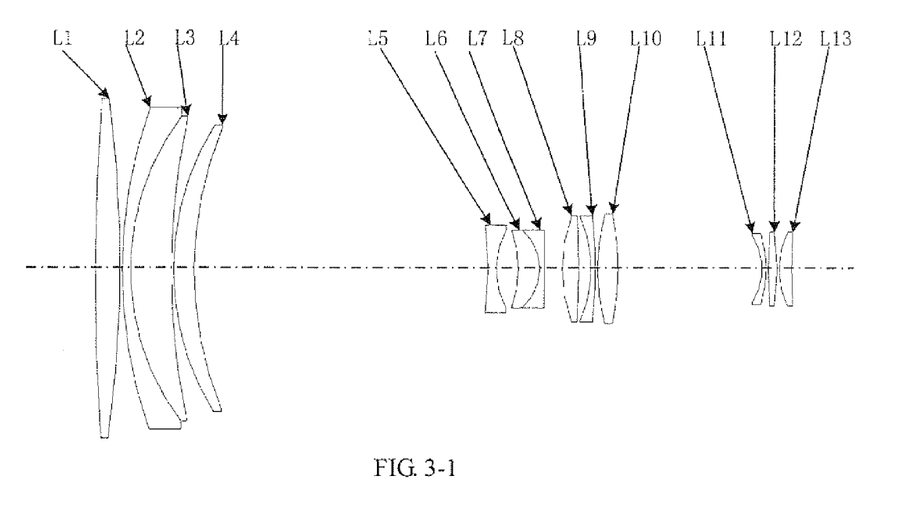
Figure 32:
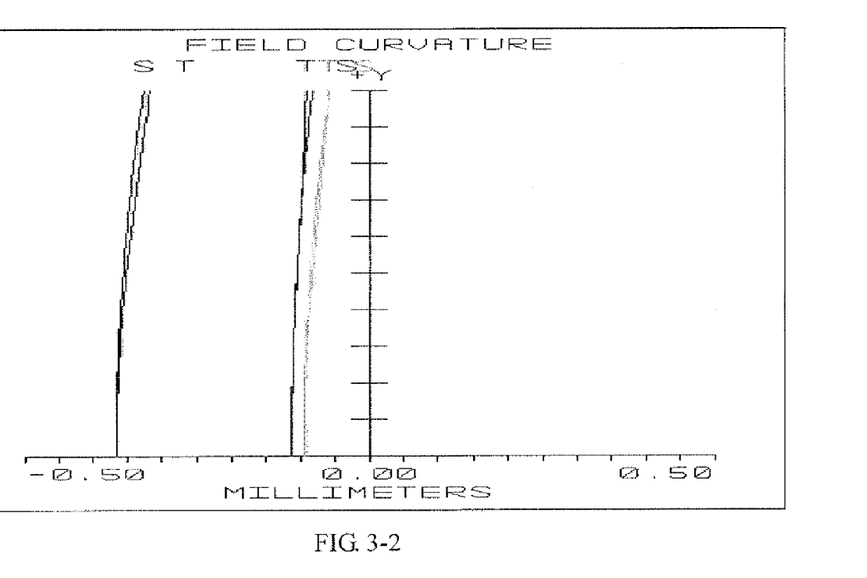
Figure 33:
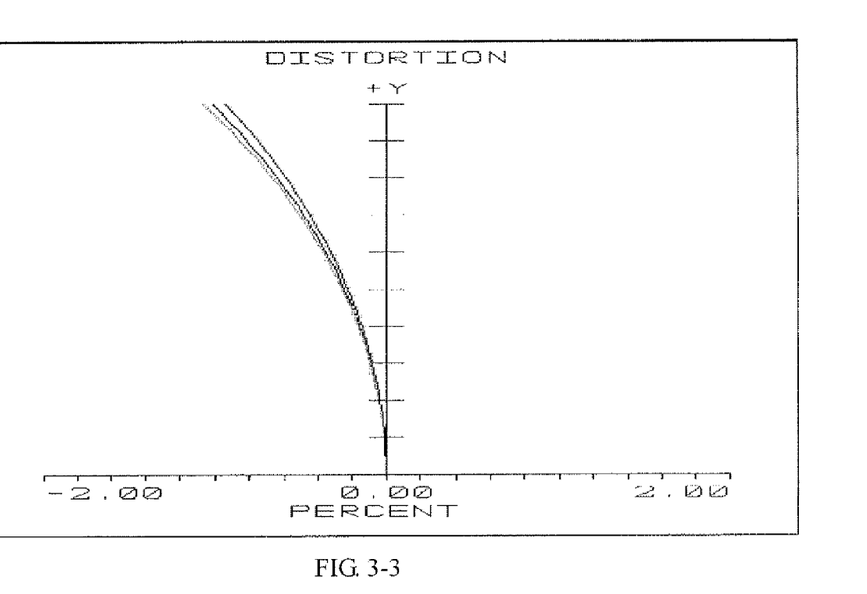
Figure 34:
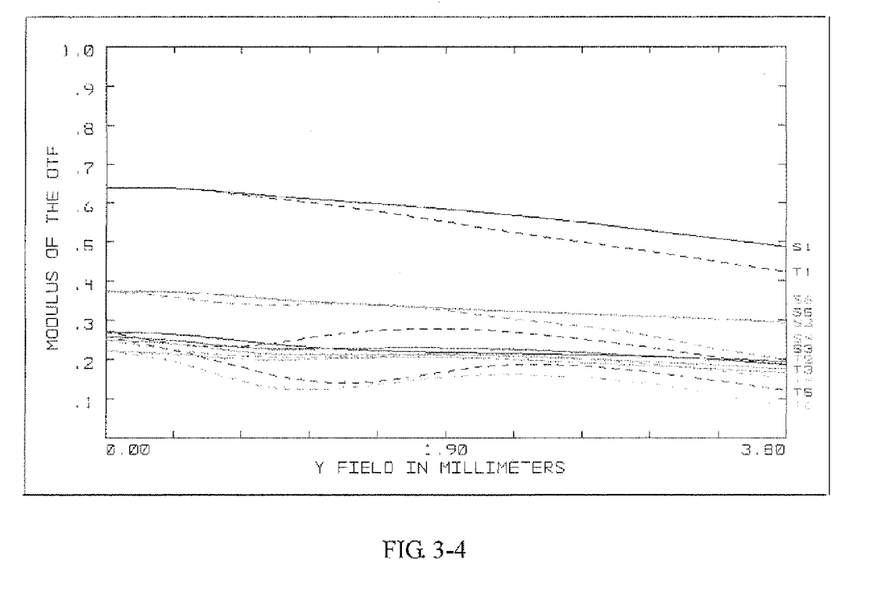
Figure 35:
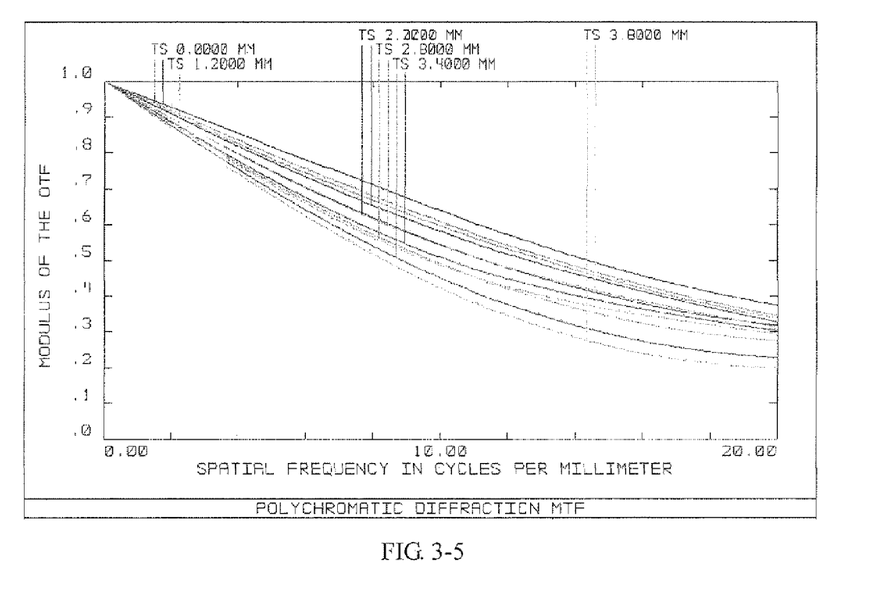

In addition, according to FIG. 2-3 and FIG. 3-3, all the distortions of the zoom lens assembly systems with mid-focal length and long focal length are positive and small, and the tolerances thereof are only 2%. Comparing to the other conventional lens assemblies (the shorter focal length has positive distortion, while the longer focal length has negative distortion, and the tolerances thereof reach 8%~10%, the images have obvious deformations), these systems have the advantage of improving image quality remarkably, where the imaging is consistent to the target image. This advantage is of crucial importance for surveillance and capturing objectives. These lens assemblies are suitable to be widely applied to various surveillance devices, especially to all-weather surveillance devices.

Further still, the present invention provides a surveillance device which includes a lens assembly for surveillance and an imaging apparatus positioned on the image side of the lens assembly for surveillance, where the lens assembly for surveillance is the zoom lens assembly for surveillance provided in this invention. The surveillance device has an imaging wavelength ranging from 450 nm to 820 nm. All-weather, large-scale, and high resolution zoom surveillance can be achieved by the device. Further still, the imaging apparatus is preferably a CCD camera.

While this invention has been specifically shown and described with references to preferred embodiments thereof, it will be understood by those skilled in the art that various changes in form and details may be made therein without departing from the scope of the invention encompassed by the appended claims.

What is claimed is:

1. A zoom lens assembly for surveillance, comprising a first lens, a second lens, a third lens, a fourth lens, a fifth lens, a sixth lens, a seventh lens, an eighth lens, a ninth lens, a tenth lens, an eleventh lens, a twelfth lens, and a thirteenth lens, which are arranged successively coaxially along a transmission direction of an incident light beam;
   the first, the eighth, the tenth, and the twelfth lenses are positive biconvex lenses; the second, the ninth, and the eleventh lenses are negative meniscus lenses; the third, the fourth, the sixth and the thirteenth lenses are positive meniscus lenses; the fifth lens is a negative biconcave lens; and the seventh lens is a negative plano-concave lens;
   the second lens and the third lens are closely attached to each other, and the sixth lens and the seventh lens are closely attached to each other;
   intermediate parts of the second, the third, the fourth, and the thirteenth lenses are convex toward a direction reverse to the transmission direction of the incident light beam;
   intermediate parts of the sixth, the ninth, and the eleventh lenses are convex toward the transmission direction of the incident light beam;
   the fifth, the sixth, and the seventh lenses are capable of moving synchronously along a direction of optical axis.

2. The zoom lens assembly for surveillance according to claim 1, wherein the first lens comprises a first surface and a second surface; the second lens comprises a third surface and a fourth surface; the third lens comprises a fifth surface and the sixth surface;
   the fourth lens comprises a seventh surface and an eighth surface; the fifth lens comprises a ninth surface and a tenth surface; the sixth lens comprises a eleventh surface and a twelfth surface; the seventh lens comprises a thirteenth surface and a fourteenth surface;
   the eighth lens comprises a fifteenth surface and a sixteenth surface; the ninth lens comprises a seventeenth surface and an eighteenth surface; the tenth lens comprises a nineteenth surface and a twentieth surface; the eleventh lens comprises a twenty first surface and a twenty second surface; the twelfth lens comprises a twenty third surface and a twenty fourth surface; the thirteenth lens comprises a twenty fifth surface and a twenty sixth surface;
   the first to the twenty sixth surfaces are arranged successively along the transmission direction of the incident light beam;
   curvature radiuses of the first to thirteenth lenses are: 600 mm, −400 mm, 100 mm, 60 mm, 60 mm, 180 mm, 70 mm, 100 mm, −100 mm, 20 mm, −30 mm, −12 mm, −12 mm, ∞, 40 mm, −200 mm, −32 mm, −100 mm, 50 mm, −70 mm, 15 mm, −28 mm, 150 mm, −65 mm, 20 mm, 144 mm, and the tolerances thereof are 5%.

3. The zoom lens assembly for surveillance according to claim 2, wherein center thicknesses of the first to thirteenth lenses are: 6 mm, 2 mm, 12 mm, 5 mm, 2 mm, 5 mm, 1 mm, 4 mm, 1 mm, 5 mm, 1 mm, 2 mm, 4 mm, and the tolerances thereof are 5%.

4. The zoom lens assembly for surveillance according to claim 3, wherein a distance between the second surface and the third surface on the optical axis is 0.5 mm;
   a distance between the sixth surface and the seventh surface on the optical axis is 0.5 mm;
   a distance between the tenth surface and the eleventh surface on the optical axis is 5 mm;
   a distance between the sixteenth surface and the seventeenth surface on the optical axis is 3 mm;
   a distance between the eighteenth surface and the nineteenth surface on the optical axis is 0.5 mm;
   a distance between the twentieth surface and the twenty first surface on the optical axis is 30 mm;
   a distance between the twenty second surface and the twenty third surface on the optical axis is 0.5 mm;
   a distance between the twenty fourth surface and the twenty fifth surface on the optical axis is 0.5 mm;
   the tolerances thereof are 5%.

5. The zoom lens assembly for surveillance according to claim 1, wherein ratios of refractive index to Abbe number of the first, the third, the fourth, the fifth, the tenth, the twelfth, and the thirteenth lenses are 1.7/54;
   ratios of refractive index to Abbe number of the second, the ninth, and the eleventh lenses are 1.8/25;
   ratio of refractive index to Abbe number of the sixth lens is 1.7/30;
   ratios of refractive index to Abbe number of the seventh and the eighth lenses are 1.6/60;
   the tolerances thereof are 5%.

6. A surveillance device, comprising a lens assembly for surveillance and an imaging apparatus positioned on the image side of the lens assembly for surveillance, wherein the lens assembly for surveillance is the zoom lens assembly for surveillance according to claim 1.

7. The surveillance device according to claim 6, wherein the zoom lens assembly for surveillance has an imaging wavelength ranging from 450 nm to 820 nm.

8. The surveillance device according to claim 6, wherein the imaging apparatus is a CCD camera.

9. The surveillance device according to claim 8, wherein the CCD camera has a sensitive area of ½".

10. The zoom lens assembly for surveillance according to claim 2, wherein ratios of refractive index to Abbe number of the first, the third, the fourth, the fifth, the tenth, the twelfth, and the thirteenth lenses are 1.7/54;

ratios of refractive index to Abbe number of the second, the ninth, and the eleventh lenses are 1.8/25;

ratio of refractive index to Abbe number of the sixth lens is 1.7/30;

ratios of refractive index to Abbe number of the seventh and the eighth lenses are 1.6/60;

the tolerances thereof are 5%.

11. The zoom lens assembly for surveillance according to claim 3, wherein ratios of refractive index to Abbe number of the first, the third, the fourth, the fifth, the tenth, the twelfth, and the thirteenth lenses are 1.7/54;

ratios of refractive index to Abbe number of the second, the ninth, and the eleventh lenses are 1.8/25;

ratio of refractive index to Abbe number of the sixth lens is 1.7/30;

ratios of refractive index to Abbe number of the seventh and the eighth lenses are 1.6/60;

the tolerances thereof are 5%.

12. The zoom lens assembly for surveillance according to claim 4, wherein ratios of refractive index to Abbe number of the first, the third, the fourth, the fifth, the tenth, the twelfth, and the thirteenth lenses are 1.7/54;

ratios of refractive index to Abbe number of the second, the ninth, and the eleventh lenses are 1.8/25;

ratio of refractive index to Abbe number of the sixth lens is 1.7/30;

ratios of refractive index to Abbe number of the seventh and the eighth lenses are 1.6/60;

the tolerances thereof are 5%.

13. The surveillance device according to claim 7, wherein the imaging apparatus is a CCD camera.

* * * * *